Sept. 20, 1966  R. S. COHEN  3,274,269
PROCESS FOR PREPARING HEXACHLOROBENZENE
Filed April 30, 1963
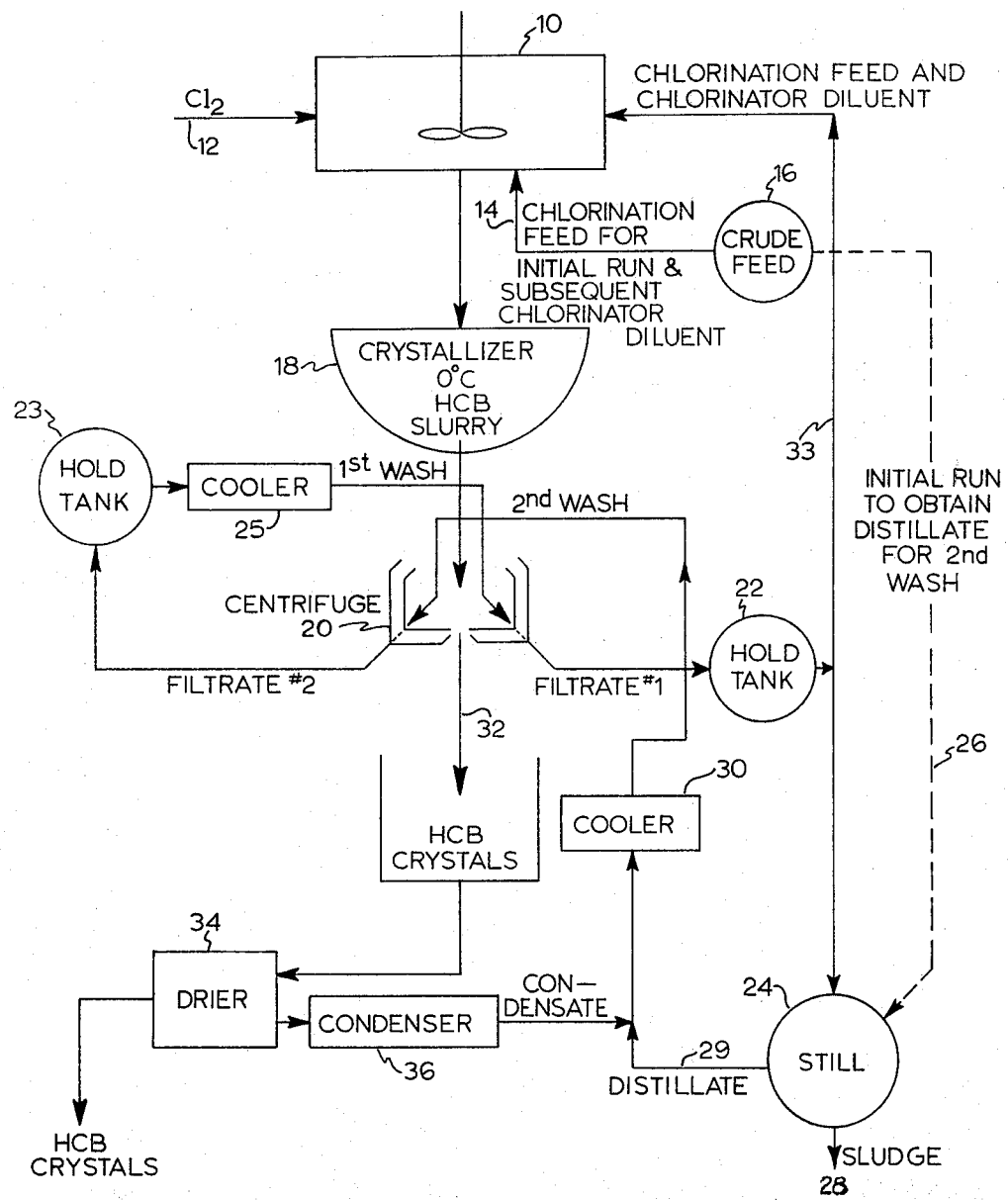
ROBERT S. COHEN
*INVENTOR.*
BY  LANE, AITKEN, DUNNER
& ZIEMS
ATTORNEYS United States Patent Office  3,274,269
Patented Sept. 20, 1966

3,274,269
PROCESS FOR PREPARING HEXACHLORO-BENZENE
Robert S. Cohen, Dover, Ohio, assignor to Dover Chemical Corporation, Dover, Ohio, a corporation of Ohio
Filed Apr. 30, 1963, Ser. No. 276,939
10 Claims. (Cl. 260—650)

This invention relates to the preparation of hexachlorobenzene and, more particularly, to an extremely economical and commercially practicable process for preparing practically pure hexachlorobenzene.

One of the more widely employed techniques for preparing pentachlorophenol involves the direct hydrolysis of hexachlorobenzene. When such a hydrolysis technique is employed, accordingly, it becomes necessary to provide a source of relatively pure hexachlorobenzene, the higher the purity of such starting material the more effective the subsequent hydrolysis process will be.

Hexachlorobenzene which may be used in such a hydrolysis process for the preparation of pentachlorophenol may be made in a variety of ways, although the two most popular techniques in use today for hexachlorobenzene production are the direct chlorination of benzenes and lower chlorinated benzenes and the dehydrogenation of benzene hexachloride (also known as hexachloro cyclohexane). A typical process representative of the former technique involves the catalytic reaction between chlorine and benzene and/or chlorobenzenes at atmospheric pressure at a temperature between 150°–200° C.; the latter technique essentially involves the dehydrogenation of benzene hexachloride through treatment of the benzene hexachloride with chlorine in the presence of a catalyst at an elevated temperature.

While techniques of the above nature are generally applicable for the production of hexachlorobenzene, a problem arises in each such process in that the immediate reaction products resulting from the chlorination process on the one hand and the dehydrogenation product on the other generally comprise a black, tarry mass from which it is extremely difficult to extract relatively pure hexachlorobenzene crystals which are usable as such in the hydrolysis process previously referred to for the production of pentachlorophenol. Currently known techniques for extracting hexachlorobenzene from this black, tarry mass are almost invariably sufficiently expensive so that the resultant cost of the pentachlorophenol prepared such hexachlorobenzene is substantially increased or such techniques are otherwise commercially impracticable.

In accordance with the present invention, a novel process has now been discovered for efficiently and economically extracting relatively pure hexachlorobenzene crystals from such tarry masses, which process is capable of correspondingly decreasing the cost of production of pentachlorophenol to a significant extent. The process of the present invention also, as will be pointed out in greater detail below, makes possible the practicable utilization of a variety of by-products from other commercial processes which by-products heretofore had been generally considered waste materials.

It is accordingly a principal object of the present invention to provide a novel process for producing hexachlorobenzene.

It is another important object of the present invention to provide a novel process for producing relatively pure hexachlorobenzene crystals which are effectively and practicably hydrolyzable to pentachlorophenol.

It is still another object of the present invention to provide a novel process for producing hexachlorobenzene from the tarry reaction product resulting from the chlorination of benzenes and the dehydrogenation of benzene hexachloride.

It is a further object of the present invention to provide a novel process for producing hexachlorobenzene involving the resolution of a heterogeneous tarry mass resulting from chlorinating benzenes into recyclable lower chlorobenzenes, used catalyst and tar on the one hand and easily separable and relatively pure hexachlorobenzene crystals on the other.

It is still another object of the present invention to provide a process for separating hexachlorobenzene from a tarry mass containing said hexachlorobenzene, used catalyst and at least one benzene compound having less than six ring-substituted chlorine atoms comprising adding to said tarry mass a liquid benzene compound having less than six ring-substituted chlorine atoms at least in sufficient quantity to dissolve the desired quantity of said other benzene compounds, catalysts and tars.

These and further objects and advantages of the present invention will become more apparent upon reference to the ensuing description, appended claims and the single drawing which illustrates a flow diagram of a preferred embodiment of the process of the present invention.

The present invention may best be described by reference to the flow diagram illustrated in the single drawing. This flow diagram illustrates a typical process within the framework of the present invention and, merely for purposes of this description, the process employed for the production of the hexachlorobenzene will be the chlorination of benzene and/or lower chlorinated benzenes.

As shown in the drawing, during the initial run of the process chlorine gas is passed into a chlorinator 10 through a feed-line 12 and reacted with a crude feed material (which may, for example, comprise a polychlorobenzene residue from the manufacture of phenol by the Raschig process, which will be in the form of an amorphous, crystalline and non-crystalline, tarry mass, or liquid) which is passed into chlorinator 10 through a feed-line 14 from a crude feed source 16. The chlorination is carried out in the presence of a catalyst such as iron oxide at approximately 180° C. and chlorine gas is continually passed into chlorinator 10 until the crude feed material has reacted sufficiently to form a solid or extremely viscous liquid or slurry at the reaction temperature. The reaction mass need not be chlorinated to this highly chlorinated state, however, but to a lesser chlorinated state if desired. The preferred method is to stop chlorinating when a practically solid tarry mass is obtained.

At the conclusion of the reaction (of the initial run), the reaction product is mixed and diluted, through line 14, while in the chlorinator and still at or near the reaction temperature, with crude feed (or a recycle stream, as subsequently explained) from which any contained solids at 0° C. have been removed by centrifuging. These solids may be recovered and used for chlorinator feed on subsequent runs. As shown in the drawing, such crude fed material is added while the chlorinated reaction product is still at or near 180° C., with agitation. After mixing, the resultant slurry is pumped to crystallizer 18 and cooled to approximately 0° C., which will resolve the contents of the crystallizer into hexachlorobenzene crystals and a still-liquid portion containing the diluent material, soluble impurities, catalyst, lower chlorinated benzenes plus a small amount of dissolved hexachlorobenzene. The hexachlorobenzene crystals are separated by centrifuge 20 in a conventional manner yielding filtrate No. 1, which is then directed into tank 22 and held there for further use as described below.

During the initial run, the first wash is dispensed with and the hexachlorobenzene crystals washed in centrifuge 20 solely with what is designated in the drawing as the second wash. In all runs subsequent to the initial run, the hexachlorobenzene crystals in centrifuge 20 are washed with a first wash liquid comprising the filtrate from a previous second wash which, as shown in the drawing, had been held in tank 23. In each first wash, wash liquid is delivered to centrifuge 20 through cooler 25 (to cool the wash to 0° C.). The filtrate (filtrate No. 1) from the first wash is combined with additional filtrate from previous centrifuging sequences in tank 22. Following the first wash, the crystals are subjected to a second wash, the filtrate from which (filtrate No. 2) is held in tank 23 and reused as first wash on the next batch.

To obtain the wash material for the second wash for the initial run, crude feed is passed into still 24 through line 26 and distilled until the still bottoms are substantially dry and vapors cease to be evolved therefrom. A small continuous still may also be used to produce the required clear distillate. Solid impurities are removed through clean-out opening 28 and the distillate 29 (cooled to 0° C. in cooler 30 and centrifuged, if necessary, to remove crystals (which may be recycled as previously mentioned)) is used as the second wash to wash the hexachlorobenzene crystals as previously described. Both the first and second washes are carried out at 0° C. so as to minimize or reduce the solubility of hexachlorobenzene. Following the washing steps, practically pure hexachlorobenzene crystals are discharged from the centrifuge at 32.

A portion of the filtrate from the crystals and first wash (filtrate No. 1), combined in tank 22, is used to charge the chlorinator 10 through feed-line 33 for all runs after the initial run, both to provide feed material to be chlorinated and to provide part of the chlorinator diluent after the chlorination reaction. The balance of the chlorinator diluent is comprised of crude feed (from which any solids at 0° C. have been centrifuged out) in an amount equivalent to the hexachlorobenzene recovered in the previous centrifuge batch. The balance of the filtrate No. 1 in tank 22 is fed to still 24 to provide clear distillate 29 for all of the crystallizing sequences following the initial run.

The hexachlorobenzene crystals removed at 32 are dried in dryer 34 at about 100° C. for 10-20 minutes to remove any excess liquid still adhering to them, which is condensed in condenser 36 and added to the distillate 29. These crystals, as produced in the laboratory, range in color from light tan to brown and their melting point ranges from 210° to 223° C. Crystals of this purity are obtainable from the practice of the present invention without the necessity for distillation or sublimation of the hexachlorobenzene. Surprisingly and unexpectedly, the crystals may be washed free of impurities, including the iron oxide or other catalyst, using the recycle scheme described.

To each batch completed in chlorinator 10 is added sufficient crude feed (through feed-line 14) to make up for hexachlorobenzene produced and enough filtrate No. 1 (through feed-line 33) to produce a free flowing slurry in crystallizer 18.

The specific reaction conditions employed for the conduct of the process described above and the relative quantities of materials used will necessarily vary depending upon the nature of the starting materials as well as the desired purity of the hexachlorobenzene crystals. Generally speaking, for batch operation, sufficient chlorine is introduced into the chlorinator at a temperature above the melting point of the chlorobenzene mixture (a suitable temperature being 180° C.) until such time as the reaction mass turns into a solid or near-solid. After dilution, as previously described, cooling in crystallizer 18 and centrifuging, washing from tank 23 (viz., the first wash) is continued until the filtrate ceases to be darkened by the washing step. The hexachlorobenzene crystals obtained at this time will be approximately light tan. The quantity of wash material used in the second wash will be determined in good part by the amount found to be needed in the first wash, and the purity of the hexachlorobenzene required. These factors must be balanced against the ability of still 24 to produce distillate to be used as wash material, it being understood that there reaches a point of diminishing returns beyond which any increase in the purity of the hexachlorobenzene crystals resulting from continued washing becomes imperceptible.

The cooling to 0° C. to crystallize out hexachlorobenzene is the preferred method of operation. However, cooling to some temperature reasonably lower than the reaction temperature will be sufficient to cause a large proportion of the hexachlorobenzene to crystallize out, and the only sacrifice in such higher temperature operation will be the recirculation of more hexachlorobenzene in the mother liquid. Hence, in the foregoing and subsequent discussions, it is to be understood that centrifuging, washing, and the like, can be carried out at a higher, or lower, temperature and such operation will be within the spirit of this invention.

Still 24 may be operated at atmospheric pressure at temperatures ranging from 165°-270° C. As a result of the distillation step which takes place in still 24, impurities which have been extracted from the chlorination product are continually removed through the still bottoms, such impurities being left in the still as a hard black material which may be easily broken up and removed following the distillation step. Such impurities include the tarry residues and used catalyst in the chlorinated reaction products and their removal greatly contributes to the success of the present invention.

In the following examples, typical runs illustrating the carrying out of the process of the present invention will be set forth. These runs employ still bottoms resulting from the distillation of dichlorobenzenes.

*Example 1*

In order to carry out the initial chlorination step to convert the crude feed to hexachlorobenzene, the liquid crude still bottoms and catalyst were placed in a three-neck round-bottomed flask equipped with a gas inlet tube extending to within one half inch of the bottom of the flask, a thermometer well and a reflux condenser. Chlorine was admitted through a flow meter at such a rate as to maintain the temperature of the reactants at 90-100° C. until the material began to solidify. At this point, increasing the chlorine would not increase the temperature further and keep the material liquid, so a heating mantle was added to provide external heat to the reactants to keep the material melted and in intimate contact with the chlorine.

This procedure, which represents a typical chlorination, may be illustrated in table form as follows:

TABLE A

| Time (Min.) | °C. Temp. | ml./min. Cl$_2$ Flow | Condition of Reaction Mass |
|---|---|---|---|
| 0 | 25 | 900 | Chlorination starts easily. |
| 10 | 90 | 900 | Material still liquid. |
| 60 | 97 | 1,100 | Do. |
| 180 | 100 | 1,100 | Material starting to solidify; heat turned on and chlorine increased. |
| 240 | 180 | 1,500 | Material solid; pour in diluent solution at once (end of chlorination). |

In five different chlorination runs, the following quantities of materials were utilized for the chlorination reaction:

TABLE B

| Material | Run No. (all weights in grams) | | | | |
|---|---|---|---|---|---|
| | No. 1 | No. 2 | No. 3 | No. 4 | No. 5 |
| Chlorine (approx. only) | 750 | 750 | 750 | 2,000 | 1,500 |
| Crude still bottoms | 100 | 100 | 100 | 272 | 143 |
| Iron oxide | 1 | 1 | 1 | 1 | [1] 0.5+ |

[1] Chlorination was very slow so more iron oxide was added.

Data which is pertinent to four complete cycles of operation of the system of the present invention are set forth below in TABLE C. All weights set forth in the table are in grams. Cycle 1 of this table represents the initial run such as has previously been described. Cycles 2, 3 and 4 are subsequent runs in which wash materials are no longer obtained from the crude feed, crude feed being used only as make-up to replenish hexachlorobenzene and chlorination impurities removed from the system.

TABLE C

|  | Cycle 1 | Cycle 2 | Cycle 3 | Cycle 4 |
|---|---|---|---|---|
| Weight of feed to chlorinator 10 | [1] 100 | [2] 100 | [2] 100 | [2] 100 |
| Weight of chlorine to chlorinator 10 | 150 | 155 | 158 | 162 |
| Weight of chlorinated reaction product | 172 | 162 | 170 | 180 |
| Weight of recycled filtrate No. 1 diluent added to chlorinator (after chlorination) | 0 | 480 | 518 | 500 |
| Weight of crude feed diluent added to chlorinator 10 through line 14 (after chlorination) | 400 | 100 | 50 | 50 |
| Weight of feed to still 24 | 216 | 122 | 133 | 130 |
| Weight of first wash (filtrate No. 2) | 0 | 208 | 109 | 112 |
| Weight distillate used as second wash | 209 | 109 | 112 | 110 |
| Weight hexachlorobenzene recovered | 78 | 100 | 126 | 153 |
| Percent yield of hexachlorobenzene based on weight of chlorinated reaction product from chlorinator 10 | 46 | 62 | 74 | 85 |
| Melting point of hexachlorobenzene (capillary tube) | 223 | 218 | 210 | 215 |

[1] Crude feed.
[2] Filtrate No. 1.

Various crude feed materials may be employed in carrying out the process of the present invention. For example, aside from the crude still bottoms described above in the illustrative examples, the crude feed may suitably be a polychlorobenzene residue resulting from the manufacture of monochlorobenzene, a polychlorobenzene residue from the manufacture of phenol by the Raschig process, the hydrolyzed alpha, beta cake from the manufacture of benezene hexachloride, benezene, or any other material which can be chlorinated or otherwise treated to form hexachlorobenzene. While, generally speaking, the raw feed need not be in the liquid state during the reaction to form hexachlorobenzene (i.e., it may suitably be in the vapor state), the liquid state is preferred and is particularly desirable for certain feeds such as for example the use of benezene hexachloride as a feed stock material.

There are a number of variations of the described cycle which will be obvious to one skilled in the art, and which may be used without departing from the general spirit of this invention. For instance, the material fed to the chlorinator 10 as the chlorinator feed (before the chlorination takes place) should generally be the lowest grade material in the system, i.e., that material having the most impurities. In the cycles described in Table C, the lowest grade material was found to be the filtrate No. 1. This came about because the crude feed was a relatively clean mixture of still bottoms from a dichlorobenzene distillation. In other cases, such as would occur in the use of so called "alpha, beta" cake as crude feed, such material would typically be a solid (at room temperature) and very black, and could not be used in the proposed scheme any place except as chlorinator feed (as distinguished from chlorinator "diluent," which would be added after the chlorination takes place), and then only when diluted with some filtrate No. 1. When using such solid starting material, of course, it will be necessary to introduce some lower chlorinated benzenes into the system to start the cycle, both as feed to the chlorinator 10 and for the second wash (in the initial cycle, only the second wash is employed). This may be done either by using lower chlorinated benzenes from an outside source or by partially chlorinating a batch of material in chlorinator 10 and drawing off lower chlorinated benzenes before the chlorination reaches a point where any significant quantity of solids forms.

As will be apparent from the foregoing description, one of the most important and far reaching advantages of the present invention is that it makes possible the convenient and economical resolution of a tarry reaction mass resulting from the formation of hexachlorobenzene into relatively pure hexachlorobenzene crystals and recyclable material which may not only be used as the means by which the pure hexachlorobenzene crystals are obtained but which may be further used as feed stock in the reaction to form the hexachlorobenzene, in which case it recycles to the chlorinator most of the catalyst. As a result of the novel process of the present invention, it is not at all necessary to indulge in lengthy and expensive procedures for removing the chlorination catalyst, for example, from the chlorinated reaction products before employing procedures to remove hexachlorobenzene therefrom. On the contrary, no special step need be conducted to remove such catalyst, such catalyst either being carried back into the chlorinator by recycling of the filtrate from hold tank 22 to chlorinator 10 or being removed from the system along with the impurities in the still bottoms through line 28. Nor is it necessary as a result of the present invention to indulge in other complex purification steps to obtain relatively high purity hexachlorobenzene.

Notwithstanding the important advantages which accrue from the ability to recycle the non-hexachlorobenzene portion of the chlorinated reaction product to the reaction zone, it is nevertheless another important feature of the present invention that hexachlorobenzene crystals may be removed from a tarry mass of the nature of that resulting from a reaction such as the chlorination reaction described above through the addition to such tarry mass of a liquid benzene compound having less than six-ring substituted chlorine atoms in sufficient quantity to dissolve the non-hexachlorobenzene portion of the tarry mass. By means of such addition, relatively pure hexachlorobenzene crystals may be obtained as in the case of the cyclic process described previously, such hexachlorobenzene crystals also being pure enough to be used directly in the production of pentachlorophenol of superior commercial quality by the hydrolysis process earlier mentioned in this specification.

NOTE: When used in this specification or claims, the term "chlorinating," "chlorinated" or the like shall be construed to cover treatment of a material with chlorine, whether or not chlorine atoms are added to the material as a result of the treatment. For example, it is not only intended to cover the situation wherein lower chlorinated benzenes are treated to add chlorine atoms to the benzene nucleus but to cover the situation wherein a starting material such as benzene hexachloride is dehydrogenated by means of chlorine treatment to form hexachlorobenzene.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:
1. A process of producing hexachlorobenzene from a raw material containing at least one compound selected from benzene and chlorinated benzenes having less than six ring-substituted chlorine atoms, comprising:
   (1) reacting said raw material with chlorine to form a chlorinated material containing hexachlorobenzene;
   (2) adding to said chlorinated material after said reaction and prior to crystallization of hexachlorobenzene therefrom at least one diluent selected from said raw material and said chlorinated material from which hexachlorobenzene and at least a portion of the tarry residues have been removed;

(3) crystallizing hexachlorobenzene from the resulting mixture;
(4) separating said hexachlorobenzene crystals and the non-hexachlorobenzene material resulting from step (3);
(5) taking a portion of the non-hexachlorobenzene material from step (4) and recycling it to step (1) as raw material to be chlorinated;
(6) taking another portion of the non-hexachlorobenzene material from step (4) and removing tarry residue therefrom; and
(7) recycling the material from step (6) remaining after the removal of said tarry residue to step (2) to be used as diluent.

2. A process as defined in claim 1 wherein before said material from step (6) is recycled to step (2), at least a portion of said material is used to wash the hexachlorobenzene crystals from step (4).

3. A process as defined in claim 1 wherein at some point during step (2) the chlorinated raw material and the diluent added thereto are cooled to induce crystallization of said hexachlorobenzene.

4. A process as defined in claim 1 wherein the chlorination reaction of step (1) is carried out in the presence of a catalyst and wherein the diluent added to said chlorinated raw material in step (2) is added without first treating the latter to remove said catalyst therefrom.

5. A process as defined in claim 1 wherein the material added to said chlorinated raw material in step (2) is added before the latter has cooled substantially from the final temperature of the chlorination reaction of step (1).

6. A process of producing hexachlorobenzene from a raw material selected from benzene and chlorinated benzenes having less than six ring-substituted chlorine atoms, comprising: reacting said raw material with chlorine to form a chlorinated material containing hexachlorobenzene; adding to said chlorinated material after said reaction and prior to crystallization of hexachlorobenzene therefrom a diluent selected from said raw material and said chlorinated material from which hexachlorobenzene and at least a portion of the tarry residues have been removed; and crystallizing hexachlorobenzene from the resulting mixture.

7. A process as defined in claim 6 wherein said raw material is benzene, chlorinated benzene or benzene hexachloride and wherein said chlorination is carried out with said raw material in liquid phase.

8. A process as defined in claim 6 wherein the chlorination reaction is carried out in the presence of a catalyst and wherein said diluent is added to said chlorinated material without first treating the latter to remove said catalyst therefrom.

9. A process of separating hexachlorobenzene from a tarry mass containing hexachlorobenzene, used catalyst and at least one compound selected from benzene and chlorinated benzenes having less than six ring-substituted chlorine atoms, comprising: adding to said tarry mass a liquid diluent selected from benzene and chlorinated benzenes having less than six ring-substituted chlorine atoms; and crystallizing hexachlorobenzene from the resulting mixture; said process being characterized by the absence of a chlorination step between the addition of said liquid diluent and said crystallization step.

10. A process as defined in claim 9 wherein said liquid diluent comprises at least a portion of said resulting mixture from which hexachlorobenzene and at least a portion of the tarry residue therein have been removed.

References Cited by the Examiner
UNITED STATES PATENTS

| | | | |
|---|---|---|---|
| 2,767,226 | 10/1956 | Weimer et al. | 260—650 |
| 2,777,003 | 1/1957 | Nicolaisen | 260—650 |

LEON ZITVER, *Primary Examiner.*

K. H. JOHNSON, K. V. ROCKEY, *Assistant Examiners.*